(12) United States Patent
Wu et al.

(10) Patent No.: US 10,769,039 B2
(45) Date of Patent: Sep. 8, 2020

(54) METHOD AND APPARATUS FOR PERFORMING DISPLAY CONTROL OF A DISPLAY PANEL TO DISPLAY IMAGES WITH AID OF DYNAMIC OVERDRIVE STRENGTH ADJUSTMENT

(71) Applicant: HIMAX TECHNOLOGIES LIMITED, Tainan (TW)

(72) Inventors: Tung-Ying Wu, Tainan (TW); Chiu-Yu Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 23 days.

(21) Appl. No.: 16/208,507

(22) Filed: Dec. 3, 2018

(65) Prior Publication Data
US 2020/0174896 A1 Jun. 4, 2020

(51) Int. Cl.
*G06F 11/16* (2006.01)
*G09G 3/22* (2006.01)
*H04N 19/176* (2014.01)

(52) U.S. Cl.
CPC .............. *G06F 11/162* (2013.01); *G09G 3/22* (2013.01); *H04N 19/176* (2014.11); *G09G 2310/0243* (2013.01)

(58) Field of Classification Search
CPC ....................................................... G09G 5/02
USPC ........................................................ 345/619
See application file for complete search history.

(56) References Cited

U.S. PATENT DOCUMENTS

| 5,592,302 | A | * | 1/1997 | Hirabayashi | ............. | H04N 7/54 375/E7.14 |
| 8,044,985 | B2 | * | 10/2011 | Shen | .................... | G09G 3/2007 345/698 |
| 8,049,691 | B2 | | 11/2011 | Pan | | |
| 8,902,297 | B2 | * | 12/2014 | Park | ....................... | G09G 3/003 348/51 |

(Continued)

FOREIGN PATENT DOCUMENTS

| CN | 107622757 A | 1/2018 |
| TW | 201214380 A1 | 4/2012 |
| TW | 201430814 A | 8/2014 |

OTHER PUBLICATIONS

"LCD and TFT Monitor Advanced Technology Guide—TFTCentral" 2001 NEC (google search).*

*Primary Examiner* — Javid A Amini
(74) *Attorney, Agent, or Firm* — Winston Hsu

(57) ABSTRACT

A method and apparatus for performing display control of a display panel to display images with aid of dynamic overdrive (OD) strength adjustment is provided. Each of the images includes a plurality of blocks, each of the plurality of blocks includes a plurality of pixels, and each of the plurality of pixels comprising a plurality of sub-pixels. The method comprising: encoding image data of a current image to generate encoded image data of the current image, wherein the encoded image data is compressed data of the image data; decoding the encoded image data of the current image to generate decoded image data of the current image; performing block error estimation to generate quantized block error values of the plurality of blocks, respectively; determining OD depressed gains, respectively; and adjusting OD strength of corresponding blocks within a next image, respectively, for controlling the display panel to display the next image.

20 Claims, 8 Drawing Sheets

(56) References Cited

U.S. PATENT DOCUMENTS

| | | |
|---|---|---|
| 10,096,273 B2 | 10/2018 | Fan |
| 2006/0152501 A1 | 7/2006 | Furihata |
| 2008/0055318 A1* | 3/2008 | Glen ........................ G09G 3/20 345/501 |
| 2014/0071143 A1* | 3/2014 | Wang ........................ G06T 1/60 345/531 |
| 2014/0210872 A1* | 7/2014 | Sasaki .................. G09G 3/3607 345/690 |
| 2017/0024852 A1* | 1/2017 | Oztireli ..................... G06T 3/40 |
| 2018/0124399 A1* | 5/2018 | Su .......................... H04N 19/91 |
| 2019/0158777 A1* | 5/2019 | Mann .................... G11B 27/031 |

* cited by examiner

METHOD AND APPARATUS FOR PERFORMING DISPLAY CONTROL OF A DISPLAY PANEL TO DISPLAY IMAGES WITH AID OF DYNAMIC OVERDRIVE STRENGTH ADJUSTMENT

BACKGROUND OF THE INVENTION

1. Field of the Invention

The present invention relates to display control of a display panel, more particularly, to a method and apparatus for performing display control of a display panel to display images with aid of dynamic overdrive strength adjustment.

2. Description of the Prior Art

In liquid crystal display (LCD) technology, display control performed through driving voltages to control rotation angles of liquid crystal materials for displaying different channel levels (e.g. gray levels) on display channels (e.g. red (R) channel, green (G) channel, blue (B) channel, etc.) is widely utilized. However, reaction time required for rotating the liquid crystal materials to specific angles need to be considered, for example, frame rate of a LCD may be 60 Hz, which means the rotation angles of the liquid crystal materials may need to be updated within 16 milliseconds for displaying corresponding channel levels. In order to accelerate the rotation of the liquid crystal materials, overdrive voltages may be applied to the liquid crystal material. For example, when a controller within a display device controls a driver to drive a current channel level (e.g. 0) of a display unit to a next channel level (e.g. 100), an overdrive voltage corresponding to a overdrive channel level (e.g. 120) may be applied to the liquid crystal material.

When a next image is going to be displayed, the aforementioned overdrive operations need to be performed according to image data of current image. However, storing full image data of an image without compressing may require large storage space. Thus, in order to reduce memory requirement, the image data of the current image may be encoded to generate compressed data before being stored in a memory, and when the next image is displayed, the compressed data may be decoded to recover the image data for overdrive operation.

Related art display devices with the aforementioned overdrive mechanisms still have some disadvantages. For example, the operations related to encoding and decoding on the current image may introduce error therein, and more particularly, utilizing a compressing method with high compression ratio may introduce more error. As a result, the overdrive operation performed on the next image may suffer from side effects such as observable chromatic defect due to incorrect channel levels of the current image. Thus, a novel method and associated apparatus are needed for solving the problems without introducing any side effect or in a way that is less likely to introduce a side effect.

SUMMARY OF THE INVENTION

An objective of the present invention is to provide a method and apparatus for performing display control of a display panel to display images with aid of dynamic overdrive (OD) strength adjustment, in order to guarantee that the display panel can perform overdrive operations properly in conjunction with compressed data.

Another objective of the present invention is to provide a method and apparatus for performing display control of a display panel to display images with aid of dynamic overdrive (OD) strength adjustment, in order to solve the related art problems without introducing any side effect or in a way that is less likely to introduce a side effect.

At least one embodiment of the present invention provides a method for performing display control of a display panel to display images with aid of dynamic overdrive (OD) strength adjustment. Each of the images may comprise a plurality of blocks, each of the plurality of blocks may comprise a plurality of pixels, and each of the plurality of pixels may comprise a plurality of sub-pixels. The method may comprises: encoding image data of a current image to generate encoded image data of the current image, wherein the encoded image data is compressed data of the image data; decoding the encoded image data of the current image to generate decoded image data of the current image; according to the image data and the decoded image data of the current image, performing block error estimation to generate quantized block error values of blocks of the current image, respectively; according to the quantized block error values, determining OD depressed gains, respectively; and according to the OD depressed gains, adjusting OD strength of corresponding blocks within a next image, respectively, for controlling the display panel to display the next image.

In addition to the above method, the present invention also provides an apparatus for performing display control of a display panel to display images with aid of dynamic overdrive (OD) strength adjustment. Additionally, each of the images may comprise a plurality of blocks, each of the plurality of blocks may comprise a plurality of pixels, and each of the plurality of pixels may comprise a plurality of sub-pixels. The apparatus may comprise an encoder, a decoder, a block error processing circuit and an OD strength depressing circuit. The encoder may encode image data of a current image to generate encoded image data of the current image, for example, the encoded image data may be compressed data of the image data, additionally, the decoder may decode the encoded image data of the current image to generate decoded image data of the current image. The block error processing circuit may perform block error estimation to generate quantized block error values of blocks of the current image according to the image data and the decoded image data of the current image, respectively. The OD strength depressing circuit may determine OD depressed gains according to the quantized block error values, respectively, and then, the OD strength depressing circuit may adjust OD strength of corresponding blocks within a next image according to the OD depressed gains, respectively, for controlling the display panel to display the next image.

The method and apparatus of the present invention provide an overdrive strength adjusting mechanism, which can guarantee that the display device can perform overdrive operations properly in conjunction with compressed data. Additionally, the method and apparatus of the present invention can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method and apparatus for performing display control of a display panel to display images with aid of dynamic overdrive (OD) strength adjustment. Examples of the display panel may include, but are not limited to: a liquid crystal display (LCD) panel. The apparatus may comprise at least one portion (e.g. a portion or all) of a display device equipped with the display panel. For example, the apparatus may comprise a control circuit of the display device, such as an integrated circuit (IC) mounted on a printed circuit board (PCB) within the display device. For another example, the apparatus may comprise the control circuit and at least one driving circuit for driving the display panel. For yet another example, the apparatus may comprise the entirety of the display device, including the display panel. Based on the method, the apparatus can properly control the display device (e.g. the display panel) to display various types of video contents while suppressing or eliminating observable chromatic defect, to guarantee the overall performance of the display device.

Figure 1:
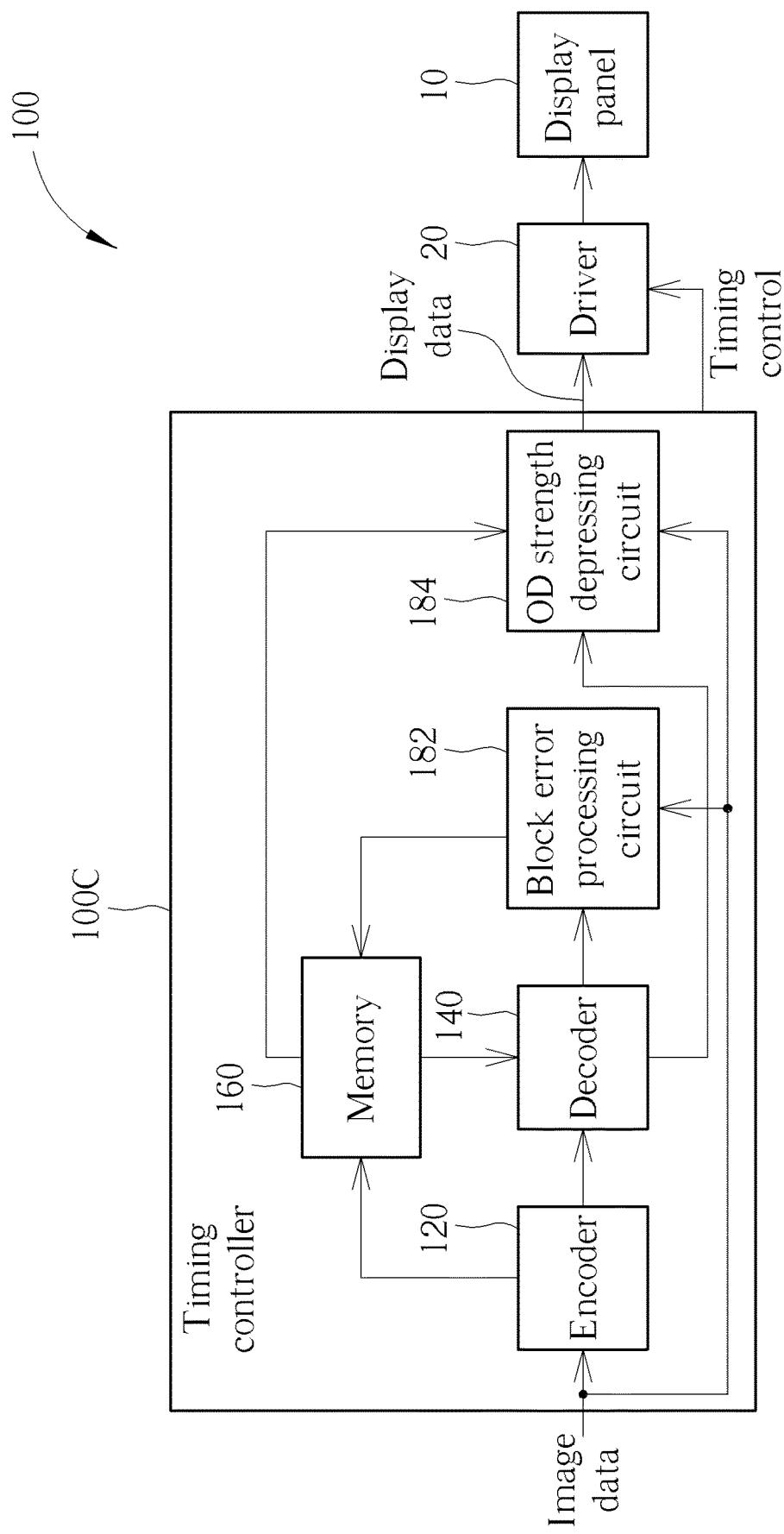
FIG. 1 is a diagram illustrating a display device according to an embodiment of the present invention.

FIG. 1 is a diagram illustrating a display device 100 according to an embodiment of the present invention. The display device 100 may comprise a display panel 10, a driver 20, and a timing controller 100C, which may be taken as examples of the aforementioned display panel, the driving circuit, and the control circuit, respectively. The driver 20 may comprise one or more source drivers and one or more gate drivers for driving the display panel 10. In addition, the timing controller 100C may comprise an encoder 120, a decoder 140, a memory 160, a block error processing circuit 182 and an OD strength depressing circuit 184. The timing controller 100C may perform display control of display panel 10 to display images with aid of dynamic OD strength adjustment, but the present invention is not limited thereto.

In this embodiment, the encoder 120 may encode image data of images frame by frame to generate encoded image data, sequentially, where the encoded image data is compressed data of the image data. Please note that the encoded image data requires less storage space in comparison with the image data, therefore the timing controller 100C may store the encoded image data in the memory 160. The decoder 140 may decode the encoded image data to generate decoded image data (which may have compression error in comparison with the image data before encoding) for compression error estimation and OD operation. According to image data and decoded image data of a current image, the block error processing circuit 182 may perform block error estimation to generate quantized block error values, and when a next image is displayed, according to the quantized error values, the OD strength depressing circuit 184 may adjust OD strength and control the display panel 10 to display the next image, but the present invention is not limited thereto.

For better comprehension, image data F1 and image data F2 may be taken as examples of image data of images of two consecutive frames, respectively, where the image data F1 may represent image data of an image of a first frame and the image data F2 may represent image data of an image of a second frame. Additionally, each of the images of the first frame and the second frame may comprise a plurality of blocks, each of the plurality of blocks may comprise a plurality of pixels, and each of the plurality of pixels may comprise a plurality of sub-pixels (which may stand for red sub-pixel, green sub-pixel and blue sub-pixel, respectively), but the present invention is not limited thereto. For brevity, the images of the first frame and the second frame may be referred to as the first image (e.g. a previous image) and the second image (e.g. a current image), respectively.

Figure 2:
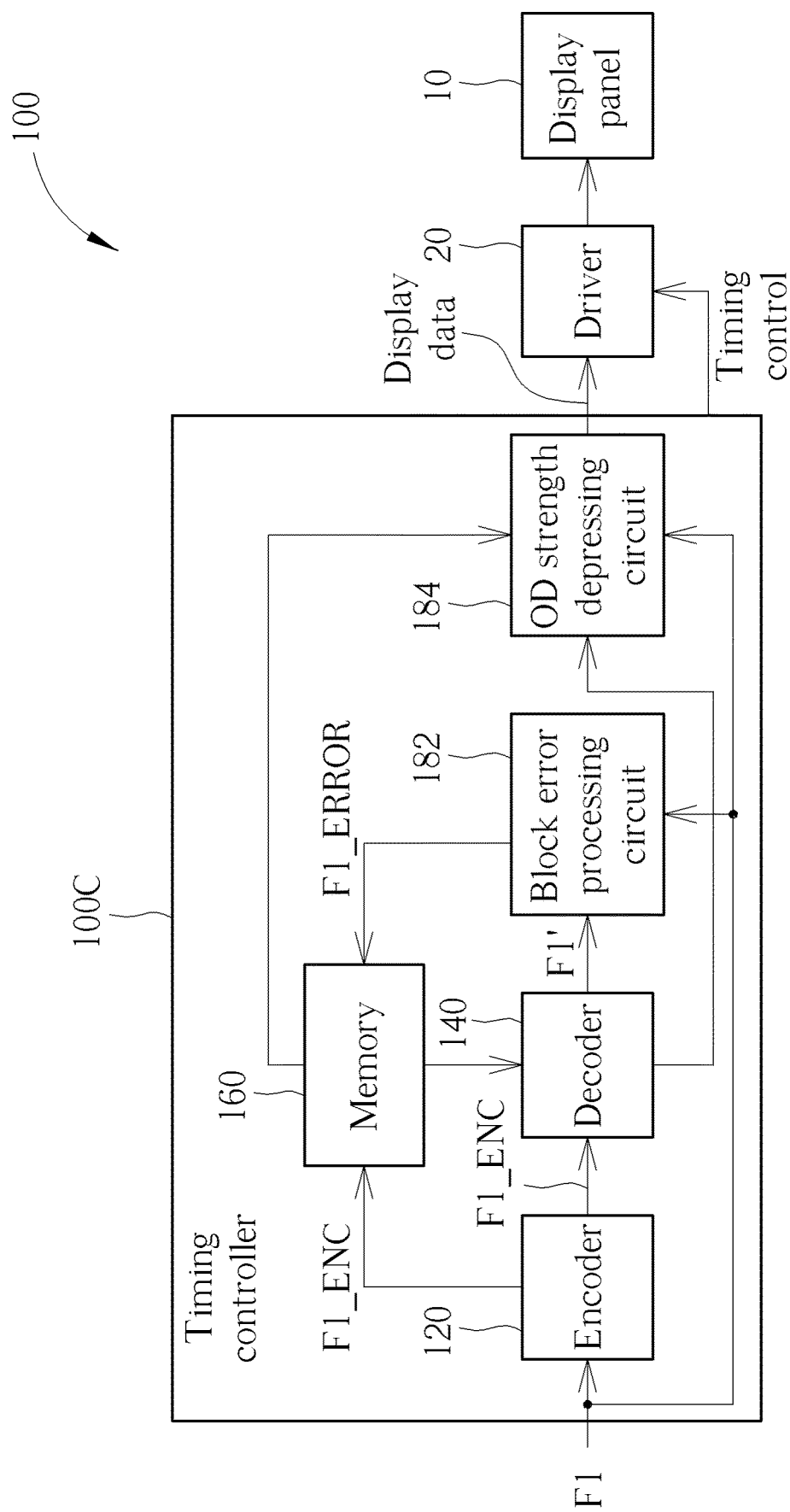
FIG. 2 is a diagram illustrating a display device operating in a first frame period according to an embodiment of the present invention.

FIG. 2 is a diagram illustrating the display device 100 operating in a first frame period according to an embodiment of the present invention. In this embodiment, when the first image is displayed, the encoder 120 may encode the image data F1 to generate encoded image data F1_ENC, the decoder 140 may decode the encoded image data F1_ENC to generate image data F1', and the timing controller 100C may store the encoded image F1_ENC in the memory 160. Then, the block error processing circuit 182 may perform the block error estimation to generate a set of quantized block error values (such as error F1_ERROR) according to the image data F1 and the image data F1', and the timing controller 100C may store the error F1_ERROR in the memory 160. Further detail operations of displaying the image data F1 is omitted here (related signal is not labeled in FIG. 2, either), which are similar to operations of displaying the image data F2, and related implementation may be provided as follow.

Figure 3:
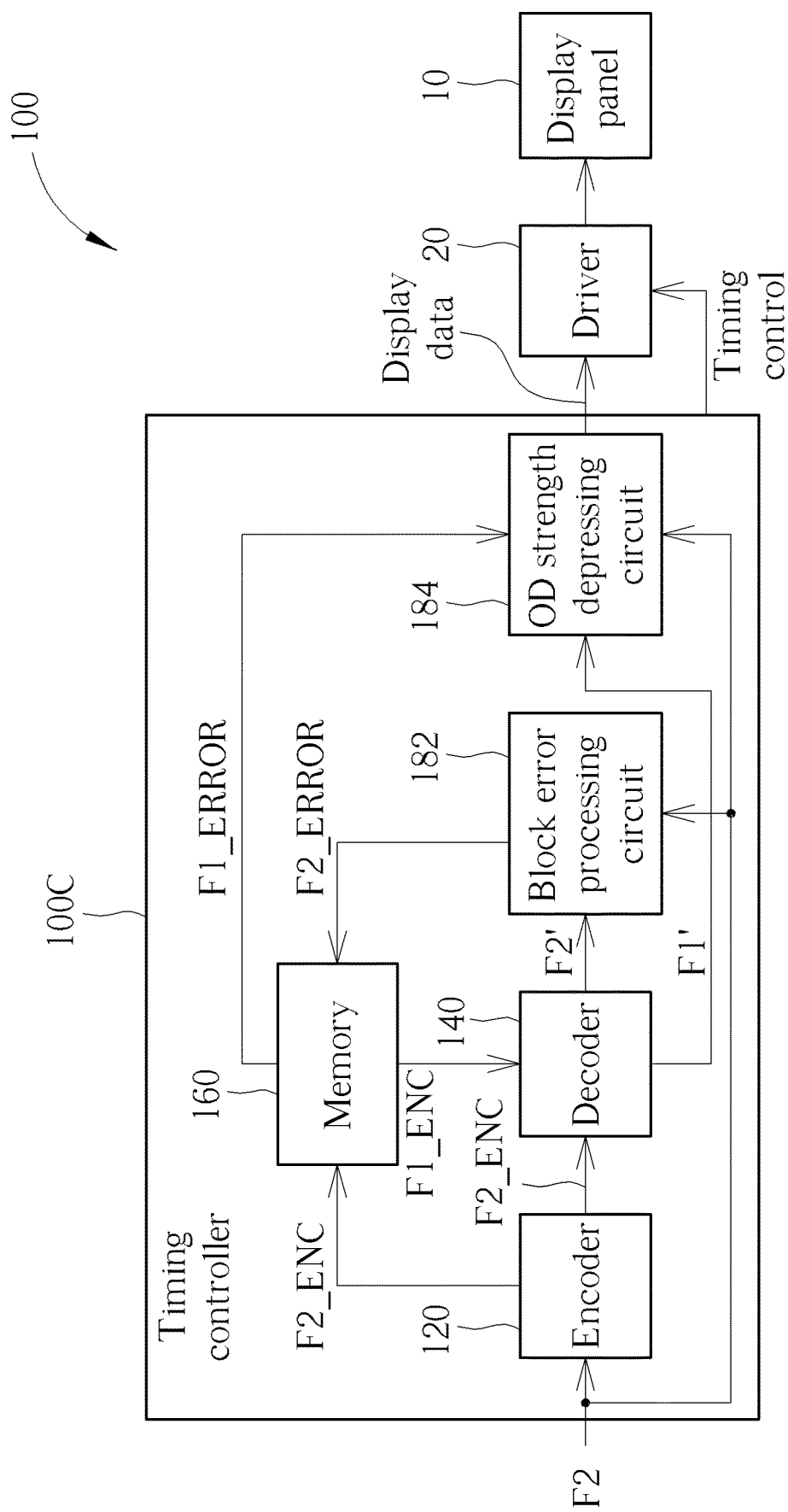
FIG. 3 is a diagram illustrating a display device operating in a second frame period according to an embodiment of the present invention.

FIG. 3 is a diagram illustrating the display device 100 operating in a second frame period according to an embodiment of the present invention. When the image data F2 is displayed, similarly, the encoder 120 may encode the image data F2 to generate encoded image data F2_ENC, the decoder 140 may decode the encoded image data F2_ENC to generate image data F2', and the timing controller 100C may store the encoded image F1_ENC in the memory 160. Then, the block error processing circuit 182 may perform the block error estimation to generate a set of quantized block error values (such as error F2_ERROR) according to the image data F2 and the image data F2', and the timing controller 100C may store the error F2_ERROR in the memory 160. In addition, the OD strength depressing circuit 184 may determine OD depressed gains respectively corresponding to blocks within the second image according to the error F1_ERROR (which is stored in the memory 160 in the first frame period), respectively, and the decoder 140 may decode the image data F1_ENC (which is stored in the memory 160 in the first frame period) to generate image data F1'. Additionally, according to the OD depressed gains and image data F1', the OD strength depressing circuit 184 may adjust OD strength of corresponding blocks within the second image, respectively, for controlling the display panel to display the second image. Similarly, when an image of a subsequent frame of the second frame is displayed, the OD strength depressing circuit 184 may adjust OD strength of corresponding blocks within the image of the subsequent frame according to the error F2_ERROR and decoded image data of the image data F2_ENC. For brevity, further detail descriptions are not repeated here.

Figure 4:
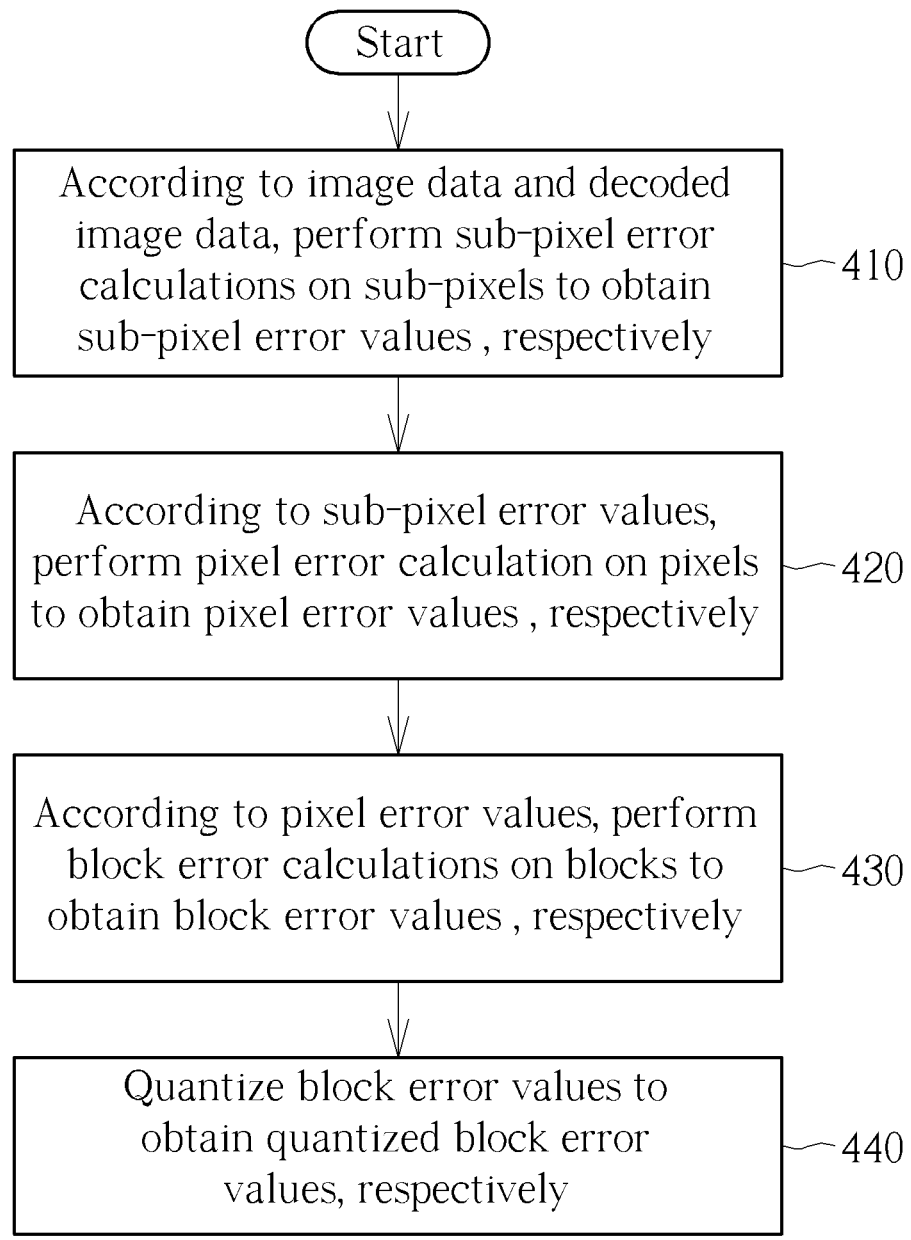
FIG. 4 is a flowchart illustrating block error estimation according to an embodiment of the present invention.
Figure 5:
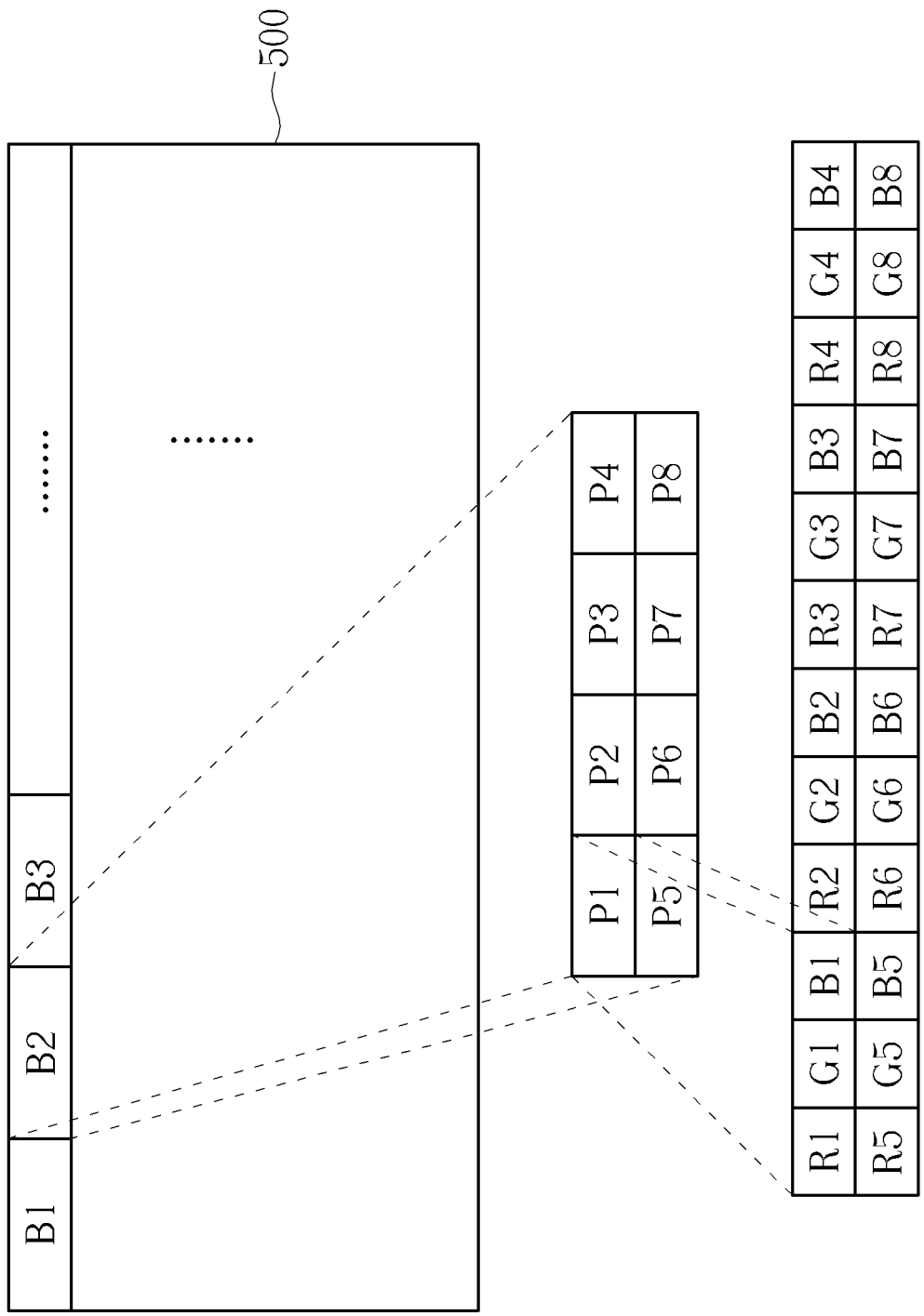
FIG. 5 is a diagram illustrating an image according to an embodiment of the present invention.

Please refer to FIG. 4 in conjunction with FIG. 5, where FIG. 4 is a flowchart illustrating the block error estimation according to an embodiment of the present invention, and FIG. 5 is a diagram illustrating an image 500 according to an embodiment of the present invention, where the image 500 may be an example of the first image, the image 500 may comprise a plurality of blocks such as blocks B1, B2, B3, . . . , each of the plurality of blocks (e.g. block B2) may comprise a plurality of pixels (e.g. pixels P1-P8 such as pixels P1, P2, P3, P4, P5, P6, P7, and P8), and each of the plurality of pixels may comprise a plurality of sub-pixels respectively stands for red sub-pixel, blue sub-pixel and green sub-pixel. For example, the pixel P1 may comprise sub-pixels R1, G1, and B1, the pixel P2 may comprise sub-pixels R2, G2, and B2, the pixel P3 may comprise sub-pixels R3, G3, and B3, the pixel P4 may comprise sub-pixels R4, G4, and B4, the pixel P5 may comprise sub-pixels R5, G5, and B5, the pixel P6 may comprise sub-pixels R6, G6, and B6, the pixel P7 may comprise sub-pixels R7, G7, and B7, and the pixel P8 may comprise sub-pixels R8, G8, and B8, where image data of the image 500 may comprise the image data of the blocks B1, B2, B3, . . . , and the decoded image data of the image 500 may comprise the decoded image data of the blocks B1, B2, B3, etc. Please note that, the image 500 is for illustrative purposes only, and is not meant to be a limitation of the present invention.

The block error processing circuit 182 may perform the block error estimation on each of the blocks B1, B2, B3, etc. For brevity, in the following description, the block B2 is taken as an example.

In Step 410, according to image data of the block B2 and decoded image data of the block B2, the block error processing circuit 182 may perform sub-pixel error calculations on sub-pixels within the block B2 to obtain sub-pixel error values of the sub-pixels within the block B2, respectively.

In Step 420, according to the sub-pixel error values, the block error processing circuit 182 may perform pixel error calculations on the pixels P1-P8 to obtain pixel error values of pixels P1-P8, respectively. More particularly, the block error processing circuit 182 may perform the pixel error calculations according to a set of predetermined sub-pixel weightings for the plurality of sub-pixels of the each of the pixels P1-P8, respectively. Taking the pixel P1 as an example, the set of predetermined sub-pixel weightings may correspond to the sub-pixels R1, G1 and B1, respectively, and a predetermined weighting for the sub-pixel G1 may be set as the greatest one within the set of predetermined sub-pixel weightings for some reasons, but the present invention is not limited thereto.

In Step 430, according to the pixel error values, the block error processing circuit 182 may perform block error calculation on the block B2 to obtain a block error value of the block B2. More particularly, according to the pixel error values, the block error processing circuit 182 may finds a maximum pixel error value, an average pixel error value and a minimum pixel error value of the pixel error values of the pixels within the block B2, and then, according to the maximum pixel error value, the average pixel error value, the minimum pixel error value, and a set of predetermined error weightings thereof, the block error processing circuit 182 may perform a first block error calculation on the block B2 to obtain a temporary block error value of the block B2, where the set of predetermined error weightings may correspond to the maximum pixel error value, the average pixel error value and the minimum pixel error value, respectively. For example, one of the maximum pixel error value, the average pixel error value and the minimum pixel error value may dominate users experience, predetermined error weighting of the one of the maximum pixel error value, the average pixel error value and the minimum pixel error value may be set as the greatest one within the set of predetermined error weightings, but the present invention is not limited thereto. In addition, for a motion video, a certain object may be located in the block B1 within the first image, and the certain object may be located in the block B2 within the second image. Thus, according to temporary block error values of a current block (such as the block B2) and adjacent blocks thereof (such as the blocks B1 and B3) and a set of predetermined spatial error weightings (which may correspond to the blocks B1, B2 and B3, respectively), the block error processing circuit 182 may perform a second error calculation on the block B2 to obtain the block error value of the block B2, but the present invention is not limited thereto.

In Step 440, the block error processing circuit 182 may quantize the block error value to obtain a quantized block error value (e.g. a 4-bit block error value) of the block B2.

TABLE 1

| Index | OD depressed gain |
|---|---|
| 0 | 1 |
| 1 | 0.9375 |
| 2 | 0.875 |
| 3 | 0.8125 |
| 4 | 0.75 |
| 5 | 0.6875 |
| 6 | 0.625 |
| 7 | 0.5625 |
| 8 | 0.5 |
| 9 | 0.4375 |
| 10 | 0.375 |
| 11 | 0.3125 |
| 12 | 0.25 |
| 13 | 0.1875 |
| 14 | 0.125 |
| 15 | 0.0625 |

Table 1 illustrates an example of a look-up table between indexes and corresponding OD depressed gains. In this embodiment, the block error processing circuit 182 may quantize the block error value of each of the blocks (such as the blocks B1, B2, B3, etc.) within the image 500 into 16 levels, for example, the block error value of each of the blocks may be represented by a 4-bit digital signal, and the 16 levels may correspond to 16 indexes (and/or 16 OD depressed gains), respectively, as shown in Table 1. According to the quantized block error values (such as the error F1_ERROR, which is temporarily stored in the memory 160), the OD strength depressing circuit 184 may determine the OD depressed gains of the blocks (such as the blocks B1, B2, B3, etc.) within the image 500 through the look-up table, respectively, but the present invention is not limited thereto.

According to this embodiment, the OD strength depressing circuit 184 may adjust OD strength of the corresponding blocks within the second image according to the OD depressed gains, respectively. Please note that, the OD adjustment of all sub-pixels of a block (corresponding to the block B1) within the second image are performed according to an OD depressed gain corresponding to the block B1, the OD adjustment of all sub-pixels of a block (corresponding to the block B2) within the second image are performed according to an OD depressed gain corresponding to the block B2, the OD adjustment of all sub-pixels of a block (corresponding to the block B3) within the second image are performed according to an OD depressed gain corresponding to the block B3, and the rest may be deduced by analogy, but the present invention is not limited thereto.

Figure 6:
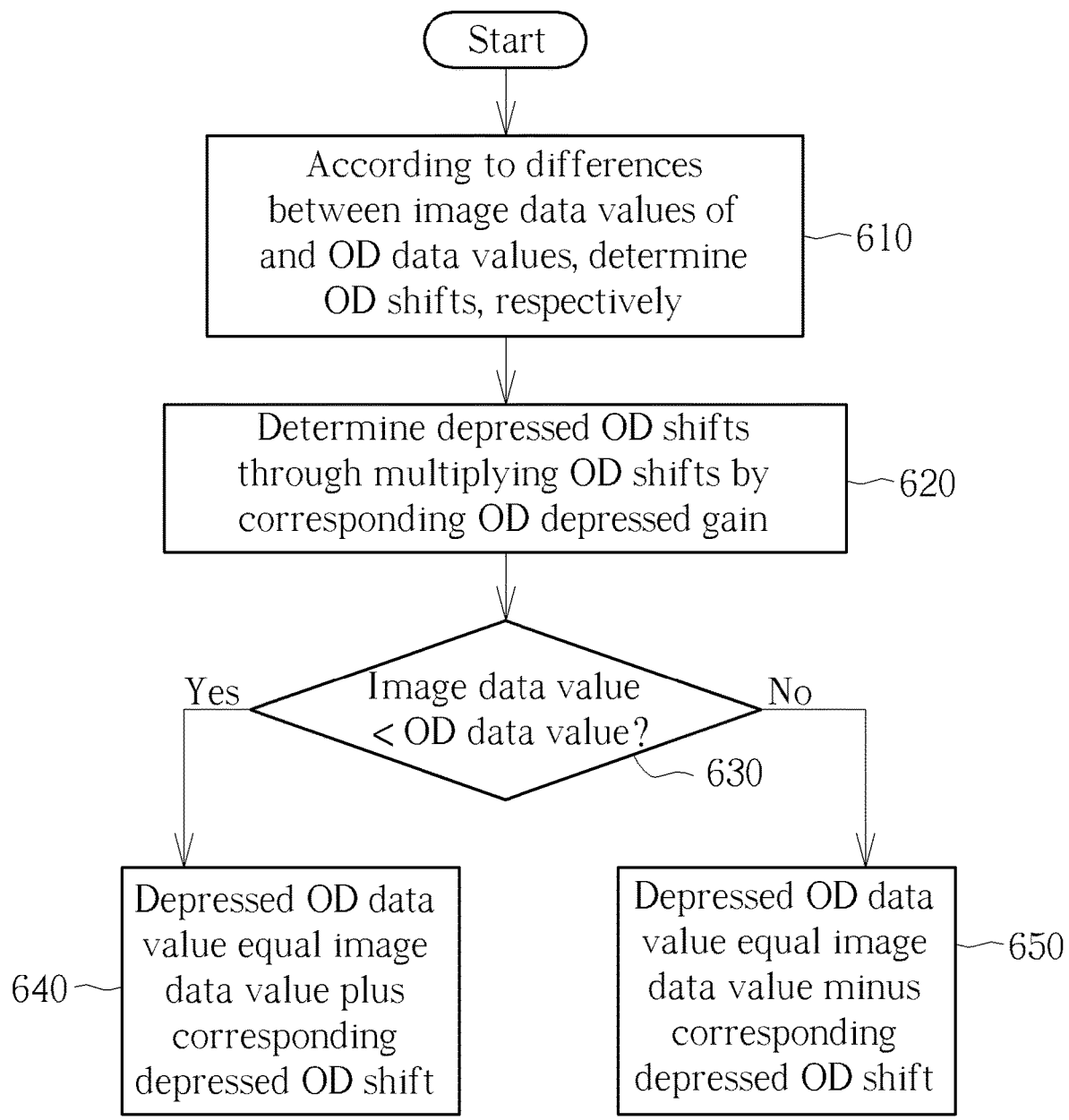
FIG. 6 is a flowchart illustrating an OD strength depressing circuit operating according to an embodiment of the present invention.

FIG. 6 is a flowchart illustrating the OD strength depressing circuit 184 operating according to an embodiment of the present invention.

In Step 610, according to differences between image data values of a block of the corresponding blocks within the second image and OD data values of the block, the OD strength depressing circuit 184 determines OD shifts of the block, respectively.

In Step 620, the OD strength depressing circuit 184 determines depressed OD shifts of the block through multiplying the OD shifts by an OD depressed gain corresponding to the block, respectively.

In Step 630, when an image data value of a sub-pixel within the second image is less than an OD data value of the sub-pixel, Step 640 is entered; otherwise, Step 650 is entered.

In Step 640, when the image data value of the sub-pixel within the second image is less than the OD data value of the sub-pixel, the OD strength depressing circuit 184 may determine a depressed OD data value of the sub-pixel equals the image data value plus a corresponding depressed OD shift.

In Step 650, when the image data value of the sub-pixel within the second image is greater than the OD data value of the sub-pixel, the OD strength depressing circuit 184 may determine the depressed OD data value of the sub-pixel equals the image data value minus the corresponding depressed OD shift.

Please note that, Step 630 may be adjusted as: when an image data value of a sub-pixel within the second image is less than or equal to an OD data value of the sub-pixel, Step 640 is entered; otherwise, Step 650 is entered, but the present invention is not limited thereto.

Figure 7:
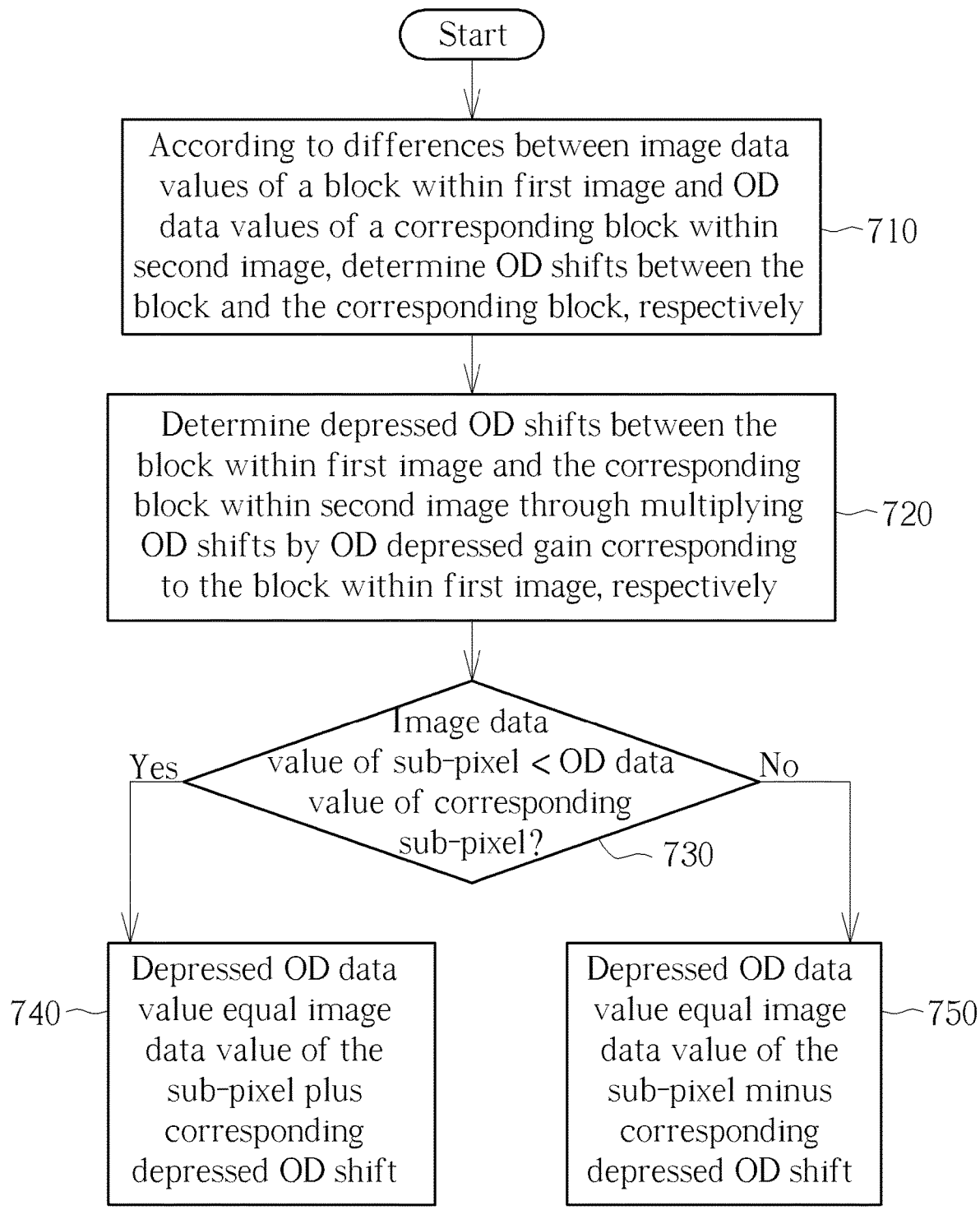
FIG. 7 is a flowchart illustrating an OD strength depressing circuit operating according to another embodiment of the present invention.

FIG. 7 is a flowchart illustrating the OD strength depressing circuit 184 operates according to another embodiment of the present invention.

In Step 710, according to differences between image data values of a block within the first image and OD data values of a corresponding block within the second image, the OD strength depressing circuit 184 may determine OD shifts between the block and the corresponding block, respectively.

In Step 720, the OD strength depressing circuit 184 may determine depressed OD shifts between the block within the first image and the corresponding block within the second image through multiplying the OD shifts by an OD depressed gain corresponding to the block within the first image, respectively.

In Step 730, when an image data value of a sub-pixel within the first image is less than an OD data value of a corresponding sub-pixel within the second image, Step 740 is entered; otherwise, Step 750 is entered.

In Step 740, when the image data value of the sub-pixel within the first image is less than the OD data value of the corresponding sub-pixel within the second image, a depressed OD data value of the corresponding sub-pixel equals the image data value of the sub-pixel plus a corresponding depressed OD shift.

In Step 750, when the image data value of the sub-pixel within the first image is greater than the OD data value of the corresponding sub-pixel within the second image, the depressed OD data value of the corresponding sub-pixel equals the image data value of the sub-pixel minus the corresponding depressed OD shift.

Additionally, the OD strength depressing circuit 184 may further comprise a protection circuit (not shown in FIG. 1-3) to guarantee OD operation. For example, when the image data value of the sub-pixel within the first image is less than the OD data value of the corresponding sub-pixel within the second image and the depressed OD data value of the corresponding sub-pixel determined in Step 730 is less than an image data value of the corresponding sub-pixel, the protection circuit may replace the depressed OD data value with a new OD data value that is equal to the image data value of the corresponding sub-pixel, but the present invention is not limited thereto. For another example, when the image data value of the pixel within the first image is greater than the OD data value of the corresponding sub-pixel within the second image and the depressed OD data value of the corresponding sub-pixel determined in Step 730 is greater than the image data value of the corresponding sub-pixel, the protection circuit may replace the depressed OD data value with a new OD data value that is equal to the image data value of the corresponding sub-pixel, but the present invention is not limited thereto.

Please note that, Step 730 may be adjusted as: when an image data value of a sub-pixel within the first image is less than or equal to an OD data value of a corresponding sub-pixel within the second image, Step 740 is entered; otherwise, Step 750 is entered, but the present invention is not limited thereto.

Figure 8:
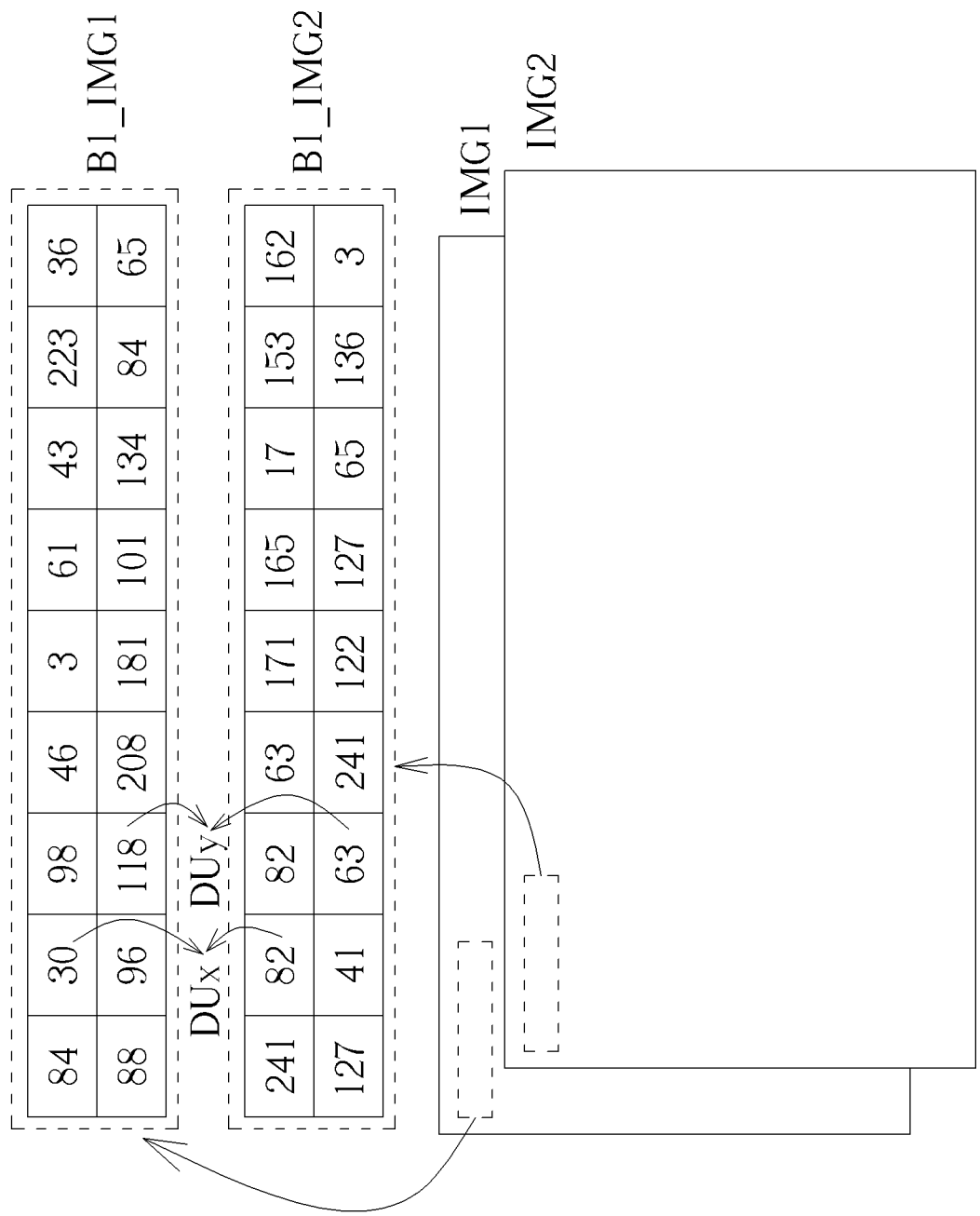
FIG. 8 illustrates images of two consecutive frames according to an embodiment of the present invention.

FIG. 8 illustrates images IMG1 and IMG2 according to an embodiment of the present invention, where the images IMG1 and IMG2 may be images of two consecutive frames. Blocks B1_IMG1 and B1_IMG2 may be specific blocks within image IMG1 and IMG2, and a value labeled in a specific field within each of the blocks B1_IMG1 and B1_IMG2 may indicate image data (e.g. channel level or gray level) of a corresponding sub-pixel. For example, a channel level (e.g. a gray level) of a sub-pixel (e.g. a red sub-pixel, a green sub-pixel or a blue sub-pixel) DUx is changed to 82 (as shown in the block B1_IMG2) from 30 (as shown in the block B1_IMG1), where an OD data value of the sub-pixel DUx is determined to be 96; for another example, a channel level of a sub-pixel DUy is changed to 63 (as shown in the block B1_IMG2) from 118 (as shown in the block B1_IMG1), where an OD data value of the sub-pixel DUy is determined to be 47; but the present invention is not limited thereto.

Taking FIGS. 8 and 6 as an example, OD shifts of the sub-pixels DUx and DUy may be determined to be "96−82=14" and "63−47=16", respectively (Step 610). Assuming that an OD depressed gain of the block with the sub-pixels DUx and DUy therein is 0.75, which may be determined by the working flow shown in FIG. 4 and a look up table such as Table 1, depressed OD shifts of the sub-pixels DUx and DUy may be determined to be "14*0.75=10.5" and "16*0.75=12", respectively (Step 620). Note that, the working flow of the sub-pixel DUx may enter Step 640 from Step 630 since 82 is less than 96, and the working flow of the sub-pixel DUy may enter Step 650 from Step 630 since 63 is not less than (e.g. greater than) 47. Therefore, depressed OD data values of the sub-pixels DUx and DUy may be determined to be "82+10.5≈93 (or 92)" and "63−12=51", respectively.

Taking FIGS. 8 and 7 as another example, OD shifts of the sub-pixels DUx and DUy between the block B1_IMG1 and B1_IMG2 may be determined to be "96−30=66" and "118−47=71", respectively (Step 710). Assuming that an OD depressed gain of the block with the sub-pixels DUx and DUy therein is 0.875, which may be determined by the working flow shown in FIG. 4 and a look up table such as Table 1, depressed OD shifts of the sub-pixels DUx and DUy may be determined to be "66*0.875=57.75" and "71*0.875=62.125", respectively (Step 720). Note that, the working flow of the sub-pixel DUx may enter Step 740 from Step 730 since 30 is less than 96, and the working flow of the sub-pixel DUy may enter Step 750 from Step 730 since 118 is not less than (e.g. greater than) 47. Therefore, depressed OD data values of the sub-pixels DUx and DUy may be determined to be "30+57.75≈88 (or 87)" and "118−62.125≈56 (or 55)", respectively. However, assuming that the OD depressed gain of the block with the sub-pixels DUx and DUy therein is 0.75 rather than 0.875, the depressed OD data values of the sub-pixels DUx and DUy may be therefore determined to be "30+49.5≈80 (or 79)" and "118−53.25≈65 (or 64)", respectively, and the protection circuit may replace the depressed OD data values of the sub-pixels DUx and DUy with new OD values that is equal to be 82 and 63, respectively.

To summarize, the present invention provides a method and apparatus for performing display control of the display panel 10 to display images with aid of dynamic overdrive strength adjustment. According to the result of block error estimation performed by the block error processing circuit 182, the OD strength depressing circuit 184 may adjust OD strength frame by frame. Display devices operating according to embodiments of the present invention can depress observable chromatic defect caused by overdrive operations based on images having compression errors, without greatly increasing additional costs. Thus, the method and apparatus of the present invention can solve the related art problems without introducing any side effect or in a way that is less likely to introduce a side effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing display control of a display panel to display images with aid of dynamic overdrive (OD) strength adjustment, each of the images comprising a plurality of blocks, each of the plurality of blocks comprising a plurality of pixels, each of the plurality of pixels comprising a plurality of sub-pixels, the method comprising:
   encoding image data of a current image to generate encoded image data of the current image, wherein the encoded image data is compressed data of the image data;
   decoding the encoded image data of the current image to generate decoded image data of the current image;
   according to the image data and the decoded image data of the current image, performing block error estimation to generate quantized block error values of blocks of the current image, respectively, wherein the quantized block error values represent compression error of the decoded image data caused by encoding;
   according to the quantized block error values, determining OD depressed gains, respectively; and
   according to the OD depressed gains, adjusting OD strength of corresponding blocks within a next image, respectively, for controlling the display panel to display the next image, wherein the OD depressed gains represent reduction magnification regarding the OD strength.

2. The method of claim 1, wherein the step of performing block error estimation to generate quantized block error values of the plurality of blocks respectively further comprises:
   according to image data of a block of the current image and decoded image data of the block, performing sub-pixel error calculations on sub-pixels within the block to obtain sub-pixel error values of the sub-pixels within the block, respectively, wherein the image data of the current image comprises the image data of the block, and the decoded image data of the current image comprises the decoded image data of the block;
   according to the sub-pixel error values, performing pixel error calculations on pixels within the block to obtain pixel error values of pixels within the block, respectively;
   according to the pixel error values, performing block error calculation on the block to obtain a block error value of the block; and
   quantizing the block error value to obtain a quantized block error value of the block.

3. The method of claim 2, wherein the step of performing the pixel error calculations on the pixels within the block to obtain the pixel error values of the pixels within the block respectively is performed according to a set of predetermined sub-pixel weightings for the plurality of sub-pixels of the each of the plurality of pixels.

4. The method of claim 2, wherein the step of performing the block error calculation on the block to obtain the block error value of the block further comprises:
   finding a maximum pixel error value, an average pixel error value and a minimum pixel error value of the pixel error values of the pixels within the block;
   according to the maximum pixel error value, the average pixel error value and the minimum pixel error value, performing a first error calculation on the block to obtain a temporary block error value; and
   according to temporary block error values of the block and adjacent blocks thereof, performing a second error calculation on the block, to obtain the block error value.

5. The method of claim 4, wherein the step of performing the first error calculation on the block to obtain the temporary block error value is performed according to a set of predetermined error weightings of the maximum pixel error value, the average pixel error value and the minimum pixel error value.

6. The method of claim 4, wherein the step of performing the second error calculation on the block to obtain the block error value is performed according to a set of predetermined spatial error weightings, wherein the set of predetermined spatial error weightings correspond to temporary block error values of a current block and the adjacent blocks thereof, respectively.

7. The method of claim 1, wherein the step of determining the OD depressed gains respectively is performed according to a look-up table.

8. The method of claim 1, wherein the step of adjusting the OD strength of the corresponding blocks within the next image respectively for controlling the display panel to display the next image further comprises:
   according to differences between image data values of a block of the corresponding blocks within the next image and OD data values of the block, determining OD shifts of the block, respectively; and determining depressed OD shifts of the block through multiplying the OD shifts by an OD depressed gain corresponding to the block, respectively;

wherein:
when an image data value of a sub-pixel of the block is less than an OD data value of the sub-pixel, a depressed OD data value of the sub-pixel equals the image data value plus a corresponding depressed OD shift; and when the image data value of the sub-pixel of the block is greater than the OD data value of the sub-pixel, the depressed OD data value of the sub-pixel equals the image data value minus the corresponding depressed OD shift.

9. The method of claim 1, wherein the step of adjusting the OD strength of the corresponding blocks within the next image respectively for controlling the display panel to display the next image further comprises:

according to differences between image data values of a block within the current image and OD data values of a corresponding block within the next image, determining OD shifts between the block and the corresponding block, respectively; and determining depressed OD shifts between the block and the corresponding block through multiplying the OD shifts by an OD depressed gain corresponding to the block, respectively;

wherein:
when an image data value of a sub-pixel of the block is less than an OD data value of a corresponding sub-pixel of the corresponding block, a depressed OD data value of the corresponding sub-pixel equals the image data value of the sub-pixel plus a corresponding depressed OD shift; and when the image data value of the sub-pixel of the block is greater than the OD data value of the corresponding sub-pixel of the corresponding block, the depressed OD data value of the corresponding sub-pixel equals the image data value of the sub-pixel minus the corresponding depressed OD shift.

10. The method of claim 9, wherein the step of adjusting the OD strength of the corresponding blocks within the next image respectively for controlling the display panel to display the next image further comprises:

when the image data value of the sub-pixel is less than the OD data value and the depressed OD data value is less than an image data value of the corresponding sub-pixel, replacing the depressed OD data value with a new OD value that is equal to the image data value of the corresponding sub-pixel; and when the image data value of the sub-pixel is greater than the OD data value and the depressed OD data value is greater than the image data value of the corresponding sub-pixel, replacing the depressed OD data value with a new OD value that is equal to the image data value of the corresponding sub-pixel.

11. An apparatus for performing display control of a display panel to display images with aid of dynamic overdrive (OD) strength adjustment, each of the images comprising a plurality of blocks, each of the plurality of blocks comprising a plurality of pixels, each of the plurality of pixels comprising a plurality of sub-pixels, the apparatus comprising:

an encoder, arranged to encode image data of a current image to generate encoded image data of the current image, wherein the encoded image data is compressed data of the image data;

a decoder, arranged to decode the encoded image data of the current image to generate decoded image data of the current image;

a block error processing circuit, arranged to perform block error estimation to generate quantized block error values of blocks of the current image according to the image data and the decoded image data of the current image, respectively, wherein the quantized block error values represent compression error of the decoded image data caused by encoding; and an OD strength depressing circuit, wherein the OD strength depressing circuit determines OD depressed gains according to the quantized block error values, respectively, and adjusts OD strength of corresponding blocks within a next image according to the OD depressed gains, respectively, for controlling the display panel to display the next image, wherein the OD depressed gains represent reduction magnification regarding the OD strength.

12. The apparatus of claim 11, wherein:
according to image data of a block of the current image and decoded image data of the block, the block error processing circuit performs sub-pixel error calculations on sub-pixels within the block to obtain sub-pixel error values of the sub-pixels within the blocks, respectively, wherein the image data of the current image comprises the image data of the block, and the decoded image data of the current image comprises the decoded image data of the block;

according to the sub-pixel error values, the block error processing circuit performs pixel error calculations on pixels within the block to obtain pixel error values of pixels within the block, respectively;

according to the pixel error values, the block error processing circuit performs block error calculation on the block to obtain a block error value of the block; and the block error processing circuit quantizes the block error value to obtain a quantized block error value of the block.

13. The apparatus of claim 12, wherein the block error processing circuit performs the pixel error calculations on the pixels within the block to obtain the pixel error values of the pixels within the blocks according to a set of predetermined sub-pixel weightings for the plurality of sub-pixels of the each of the plurality of pixels, respectively.

14. The apparatus of claim 12, wherein:
according to the pixel error values, the block error processing circuit finds a maximum pixel error value, an average pixel error value and a minimum pixel error value of the pixel error values of the pixels within the block;

according to the maximum pixel error value, the average pixel error value and the minimum pixel error value, the block error processing circuit performs a first error calculation on the block to obtain a temporary block error value; and according to temporary block error values of the block and adjacent blocks thereof, the block error processing circuit performs a second error calculation on the block, to obtain the block error value.

15. The apparatus of claim 14, wherein the block error processing circuit performs the first error calculation on the block to obtain the temporary block error value according to a set of predetermined error weightings of the maximum pixel error value, the average pixel error value and the minimum pixel error value.

16. The apparatus of claim 14, wherein the block error processing circuit performs the second error calculation on the block to obtain the block error value according to a set of predetermined spatial error weightings, wherein the set of predetermined spatial error weightings correspond to temporary block error values of a current block and the adjacent blocks thereof, respectively.

17. The apparatus of claim 11, wherein the OD strength depressing circuit determines the OD depressed gains according to a look-up table, respectively.

18. The apparatus of claim 11, wherein:
- according to differences between image data values of a block of the corresponding blocks within the next image and OD data values of the block, the OD strength depressing circuit determines OD shifts of the block, respectively; and
- the OD strength depressing circuit determines depressed OD shifts of the block through multiplying the OD shifts by an OD depressed gain corresponding to the block, respectively;

wherein:
- when an image data value of a sub-pixel of the block is less than an OD data value of the sub-pixel, a depressed OD data value of the sub-pixel equals the image data value plus a corresponding depressed OD shift; and
- when the image data value of the sub-pixel of the block is greater than the OD data value of the sub-pixel, the depressed OD data value of the sub-pixel equals the image data value minus the corresponding depressed OD shift.

19. The apparatus of claim 11, wherein:
- according to differences between image data values of a block within the current image and OD data values of a corresponding block within the next image, the OD strength depressing circuit determines OD shifts between the block and the corresponding block, respectively; and
- the OD strength depressing circuit determines depressed OD shifts between the block and the corresponding block through multiplying the OD shifts by an OD depressed gain corresponding to the block, respectively;

wherein:
- when an image data value of a sub-pixel of the block is less than an OD data value of a corresponding sub-pixel of the corresponding block, a depressed OD data value of the corresponding sub-pixel equals the image data value of the sub-pixel plus a corresponding depressed OD shift; and
- when the image data value of the sub-pixel of the block is greater than the OD data value of the corresponding sub-pixel of the corresponding block, the depressed OD data value of the corresponding sub-pixel equals the image data value of the sub-pixel minus the corresponding depressed OD shift.

20. The apparatus of claim 19, wherein the OD strength depressing circuit further comprises a protection circuit, wherein:
- when the image data value of the sub-pixel is less than the OD data value and the depressed OD data value is less than an image data value of the corresponding sub-pixel, the protection circuit replaces the depressed OD data value with a new OD value that is equal to the image data value of the corresponding sub-pixel; and
- when the image data value of the sub-pixel is greater than the OD data value and the depressed OD data value is greater than the image data value of the corresponding sub-pixel, the protection circuit replaces the depressed OD data value with a new OD value that is equal to the image data value of the corresponding sub-pixel.

\* \* \* \* \*